(12) United States Patent
Hohmann et al.

(10) Patent No.: US 9,915,406 B2
(45) Date of Patent: Mar. 13, 2018

(54) ILLUMINATION DEVICE FOR VEHICLES

(71) Applicant: Hella KGaA Hueck & Co., Lippstadt (DE)

(72) Inventors: Carsten Hohmann, Warstein (DE); Martin Mügge, Geseke (DE); Antti Mäkiranta, Salo (FI)

(73) Assignee: Hella KGaA Hueck & Co., Lippstadt (DE)

( * ) Notice: Subject to any disclaimer, the term of this patent is extended or adjusted under 35 U.S.C. 154(b) by 174 days.

(21) Appl. No.: 15/024,277

(22) PCT Filed: Oct. 1, 2014

(86) PCT No.: PCT/EP2014/071005
§ 371 (c)(1),
(2) Date: Mar. 24, 2016

(87) PCT Pub. No.: WO2015/049264
PCT Pub. Date: Apr. 9, 2015

(65) Prior Publication Data
US 2016/0230950 A1      Aug. 11, 2016

(30) Foreign Application Priority Data

Oct. 1, 2013   (DE) .................. 10 2013 110 839

(51) Int. Cl.
*F21S 8/10*   (2006.01)
*B60Q 1/00*   (2006.01)
(Continued)

(52) U.S. Cl.
CPC ........ *F21S 48/2243* (2013.01); *B60Q 1/0058* (2013.01); *B60Q 1/2607* (2013.01);
(Continued)

(58) Field of Classification Search
CPC ........ F21S 48/2243; F21S 48/23; B60Q 1/30; B60C 1/2607
See application file for complete search history.

(56) References Cited

U.S. PATENT DOCUMENTS 6,727,963 B1 *   4/2004   Taniguchi ............ G02B 6/0036
                                                                 349/65
2004/0218400 A1 * 11/2004 Egashira .............. B60Q 1/2607
                                                                 362/520

(Continued)

FOREIGN PATENT DOCUMENTS

DE      719930      4/1942
DE     1093685     11/1960
(Continued)

*Primary Examiner* — Karabi Guharay
(74) *Attorney, Agent, or Firm* — Husch Blackwell LLP (57) ABSTRACT

An illumination device for vehicles, in particular rear light, with a light-emitting unit to generate a predetermined light function. The device comprises a plurality of light sources and an optical unit. The optical unit comprises a light guide with means for the deflection of the light coupled in the same, and a retroreflective unit to generate a retroreflective function. The light guide is designed as a low-profile light guide, which is arranged in the main radiation direction in front of the retroreflective unit. The means for deflecting the light are distributed on or in the low-profile light guide such that the first light beam emitted from the light source and coupled into a narrow side of the low-profile light guide is coupled out at a front flat side of the low-profile light guide to produce the predetermined light function. A second light beam coming from the outside passes the front flat side and a rear flat side of the low-profile light guide and is incident on the retroreflective unit and is reflected by it back through the rear flat side and the front flat side of the low-profile light guide in the main radiation direction to generate the retroreflective function.

18 Claims, 4 Drawing Sheets

(51) Int. Cl.
*B60Q 1/26* (2006.01)
*B60Q 1/30* (2006.01)

(52) U.S. Cl.
CPC .............. *B60Q 1/30* (2013.01); *F21S 48/215* (2013.01); *F21S 48/2268* (2013.01); *F21S 48/2281* (2013.01); *F21S 48/23* (2013.01)

(56) References Cited

U.S. PATENT DOCUMENTS

| | | |
|---|---|---|
| 2006/0061994 A1 | 3/2006 | Liao |
| 2010/0073954 A1* | 3/2010 | Gebauer ............. F21S 48/2243 362/551 |
| 2013/0114293 A1* | 5/2013 | Morino ................. G02B 6/002 362/608 |

FOREIGN PATENT DOCUMENTS

| | | |
|---|---|---|
| DE | 103 59 182 A1 | 7/2005 |
| DE | 102009035741 A1 | 2/2011 |
| DE | 102011016416 A1 | 10/2012 |
| EP | 0952388 | 10/1999 |
| EP | 1176359 | 1/2002 |
| EP | 1176360 A2 | 1/2002 |
| EP | 1762433 | 3/2007 |
| EP | 2080948 | 7/2009 |
| EP | 2354637 A2 | 8/2011 |
| FR | 2894321 | 6/2007 |

\* cited by examiner

ILLUMINATION DEVICE FOR VEHICLES

CROSS REFERENCE

This application claims priority to PCT Patent Application No. PCT/EP2014/071005, filed 1 Oct. 2014, which itself claims priority to German Application No. 10 2013 110 839.3, filed 1 Oct. 2013, the entirety of both of which are hereby incorporated by reference.

FIELD OF THE INVENTION

The invention relates to an illumination device for a vehicle, in particular rear light, with a light-emitting unit for producing a predetermined light function, comprising a plurality of light sources and an optical unit, said optical unit comprising a light guide with means for the deflection of the light from the light source conducted through the light guide, and with a retroreflective unit for producing a retroreflective function.

BACKGROUND OF THE INVENTION

From EP 1176360 A2 is known an illumination device for vehicles comprising a light-emitting unit for producing a predetermined light function and a retroreflective unit to produce a retroreflective light function. The light-emitting unit comprises, as an optical unit, a plurality of rod-shaped light guides, on which light sources are frontally arranged. At a rear shell side of the rod-shaped light guide in the main direction of the light emission are arranged dispersive optical elements so that the light incident on them is deflected in the main radiation direction and exits at a front shell surface of the rod-shaped light guide. The retroreflective unit comprises a plurality of strip-shaped reflecting surfaces, which are arranged between the rod-shaped light guides of the light-emitting unit. The reflecting surfaces are connected to the adjacent rod-shaped light guides so that the number of components can be reduced. The light-emitting unit and the retroreflective unit are thus arranged substantially side by side.

From DE 103 59 182 A1 is known an illumination device for vehicles that comprises a light-emitting unit for producing a predetermined light function and a retroreflective unit for producing a retroreflective function. The retroreflective unit is arranged in the main direction of the light emission in front of a bar-shaped light guide of the lighting unit. The light guide is part of an optical unit, which additionally comprises a reflector, to which is conducted the light coupled out over a lateral surface of the light guide and then discharged by means of the reflector in the main radiation direction past the retroreflective unit. For this purpose, the rod-shaped light guide comprises, on a front lateral surface in the main direction of emission, dispersive optical elements by means of which the light launched on the face end by the light sources is deflected in the direction of the rear reflector.

Advantageously, the illuminated panel for the production of the light function can be increased by means of the reflector. However, the surface of the retroreflective unit must be excluded from this.

SUMMARY OF THE INVENTION

The object of the present invention is therefore to further develop an illumination device for a vehicle with an integrated retroreflective unit such that in a simple way a space-saving provision of light and retroreflective function is ensured.

To achieve this object, the invention in conjunction with the preamble of claim 1 is characterized in that the light guide is designed as a low-profile light guide, which in the main radiation direction is arranged in front of the retroreflective unit, and that the means for deflecting the light are distributed at and/or in the light guide in such a way in such a manner that a first light beam emitted from the light source and launched into a narrow side of the low-profile light guide is coupled out on a front flat side of the low-profile light guide for producing the predetermined light function and that a second light beam, coming from outside passing through the front flat side and a rear flat side of the low-profile light guide, is incident on the retroreflective unit and is reflected by it through the rear flat side and the front flat side of the low-profile light guide in the main direction for producing the retroreflective function.

The particular advantage of the invention is that by configuration of a light guide of a light-emitting unit as a low-profile light guide, a functional surface is provided which can be used both for the light function as well as for the retroreflective function. The retroreflective unit is arranged in the main radiation direction behind the low-profile light guide. Since the low-profile light guide has means for deflecting the injected light only to a limited extent, it can couple out not only a first light beam in the main radiation direction for the production of the light function, but also let pass a second light beam between a front and a rear flat side of the low-profile light guide for retroreflective function. Due to the double use of the function space for the lighting and retroreflective function, the light-emitting unit can be formed smaller. In addition, thereby also a reduction in weight of the illumination device can be achieved.

According to a preferred embodiment of the invention, dispersive optical elements are provided as a means for deflecting the light launched into the low-profile light guide, which are arranged on a rear side of the low-profile light guide. The dispersive optical elements are only partially introduced at the rear flat side so that the retroreflective function is always given in highly transparent section or dispersive optics-free sections of the low-profile light guide. Advantageously, the dispersive optical elements can be formed already during the manufacturing of the low-profile light guide.

According to a development of the invention, the dispersive optical elements are distributed over the rear flat side of the low-profile light guide according to a predetermined pattern. In this way, both a homogeneous light output and a homogeneous reflection can take place.

According to a development of the invention, the dispersive optical elements are distributed over the rear side of the flat low-profile light guide corresponding to a stripe pattern or a chessboard pattern. A regular and/or uniformly distributed arrangement of the dispersive optical elements provides a homogeneous light emission or retroreflective function.

According to a development of the invention, the dispersive optical elements are applied on the back side of the flat low-profile light guide by erosion or by etching or by laser. In this way, the dispersive optical elements can be applied in a simple manner.

According to another embodiment of the invention, the dispersive optical elements are applied by printing or by painting on the rear side of the low-profile light guide. Advantageously, a desired pattern can be thereby subsequently applied.

According to a further embodiment of the invention, dispersive optics particles are distributed within the low-profile light guide as a means for deflecting the injected light. Preferably, the dispersive optics particles are formed as nanoparticles so that the low-profile light guide in the non-operating state of the light-emitting unit is perceived as highly transparent or only very slightly diffuse disc so that the reflecting function is guaranteed. When the light-emitting unit is in the operating state, the light propagates in the surface of the low-profile light guide and is scattered by the nanoparticles so that the entire surface of the low-profile light guide illuminates. Advantageously, the low-profile light guide illuminates evenly in its entire surface. No optical structure or printing adapted to the retroreflective function needs to be applied. The nanoparticles are substantially effective only for the lateral light input into the light guide and for the light radiation from the light guide generated by the nanoparticles, while with the light beam (L2) passing through the surface of the light guide they have only a very low scattering effect for the reflector function, and the reflector function is thereby only slightly reduced.

According to another embodiment of the invention, the low-profile light guide can be made of a first material containing nanoparticles and a second nanoparticle-free material. Thus in the operating state of the light-emitting unit only those surface areas of the low-profile light guide glow which have nanoparticles. It is thus possible to create a pattern of light scattering along the low-profile light guide, as is provided by the machining of the rear side of the low-profile light guide according to the other embodiment of the invention.

According to a development of the invention, the low-profile light guide comprises on the edge an arcuate light-receiving section, which is associated with a plurality of light sources. In this way, the light sources can be arranged in a plane perpendicular to the main radiation direction.

The light sources can be advantageously arranged on a circuit board, which is equipped with further light sources for producing further light functions. Thus, multiple lighting functions can be advantageously provided in the surface in a cost saving manner. The illumination device can thereby have a relatively flat, compact structure.

According to a preferred embodiment of the invention, the retroreflective unit comprises a reflecting surface of such size and the low-profile light guide comprises scattering optics-free surfaces of such size that are at least as large as a minimum reflective surface section. In this way it is ensured that a sufficiently large area is always provided for the retroreflective function.

According to a preferred embodiment of the invention, the low-profile light guide is produced by injection molding, wherein with increasing distance to the light receiving section the dispersive optical elements are formed greater or in a higher distribution density.

Advantageously, the low-profile light guide can be made together with the dispersive optics element in one step. Since with increasing distance from the light input the light scattering becomes little by little greater, a homogeneous radiation of the light functions can be ensured.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

An illumination device according to the invention can be used, for example, as a rear light for trucks or trailers. Alternatively, the illumination device can be also used in rear lights of passenger cars.

According to an embodiment of the illumination device according to the FIGS. 1 to 7, a rectangular housing 1 is provided, which has a relatively flat opening. In the opening of the housing 1, there are arranged a light-emitting unit 3 for producing a rear light function as well as a reflector unit 4 in a central region 2. On opposite sides of the light-emitting unit 3 are arranged further light-emitting units with a strip-shaped illuminated panel. A brake light unit 5 for producing a brake light is arranged on a face end of the housing 1. Adjacent to the brake light unit 5 is arranged a flashing light unit 6 for generating a direction indicator. At an opposite face end of the housing 1 is arranged a rear fog lamp unit (7) for generating a fog light, and adjacent thereto is arranged a rear light unit for generating a reversing light. The light-emitting unit 3 to generate the rear light has for spatial radiation thereof a low-profile light guide 9 as a light guide. The low-profile light guide 9 serves at the same time as the optical unit for the light-emitting unit 3.

The low-profile light guide 9 is formed rectangular and has front flat sides 10 arranged in the front in the main radiation direction H of the illumination device, and a rear flat side 11 arranged at the back in the main radiation direction H. On opposite sides, a light input section 12 of the low-profile light guide 9, which is arcuate, joins the flat sides 10, 11. The light input section 12 allows a 90 degree deflection of the low-profile light guide 9 on an edge thereof, so that a first light beam L1 of the light sources 14 can be launched into the low-profile light guide 9 through a narrow side 13 of the low-profile light guide 9 arranged at a free end of the light input section 12, wherein the light sources 14 are arranged in a common plane and have an optical axis A, which extends parallel to the main radiation direction H of the illumination device. As shown particularly in FIG. 4, the light sources 14 assigned to the rear light-emitting unit 3 are arranged in a row R1, R1'. The row R1, R1' of the light sources 14 is parallel offset to a row R2 of the light sources 14 for the brake light unit 5, to a row R3 of light sources 4 for the blinking light unit 6, to a row R4 of the light sources 14 for the rear fog light unit 7 and a row R5 of the light sources 14 for the reversing light unit 8. The light sources 14 of the rows R1, R2, R3 are arranged on a first circuit board 15 and the rows R1, R4 and R5 are arranged on a second circuit board 16.

The first circuit board 15 and the second circuit board 16 are set in the housing 1 by engagement with a bottom thereof. In the central region 2 between the first circuit board 15 and the second circuit board 16 is arranged the reflector unit 4, wherein a square housing 17 of the reverse light unit 4 accommodates a triangular reflecting surface 18.

The retroreflective unit 4 has a greater thickness than the printed circuit boards 15, 16. The light input sections 12 of the low-profile light guide 9 have such an arc length that the low-profile light guide 9 covers the retroreflective unit 4 with its front and rear flat sides 10, 11 or is arranged in the main radiation direction H in front of the retroreflective unit 4. In order to distinguish the light-emitting units 3, 5, 6, 7.8 from each other, a covering diaphragm 19 is provided, which has a square opening 20 in the central region and line-shaped openings 21 at opposite ends. The line-shaped openings 21 have reflector segments 22 adapted to the light sources 14 of the brake light unit 5, the flashing light unit 6, the rear fog lamp unit 7 and the reverse light unit.

The diaphragm 19 is connected by fastening means 23 to the housing 1. For this purpose, the housing 1 comprises projecting domes 24, into which can be screwed the fastening means 23 designed as a screw means. On the outside, the illumination device thus formed is closed with a transparent cover plate which is not shown.

Figure 1:
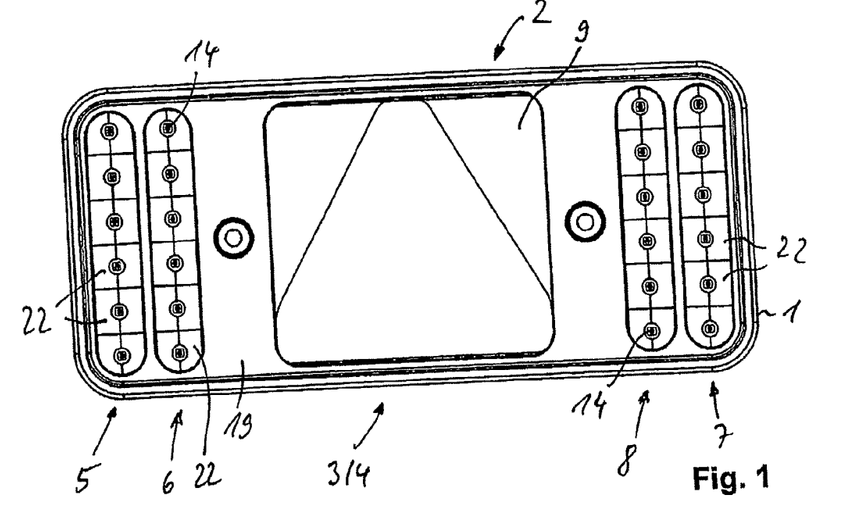
FIG. 1 shows a plan view of an illumination device.
Figure 2:
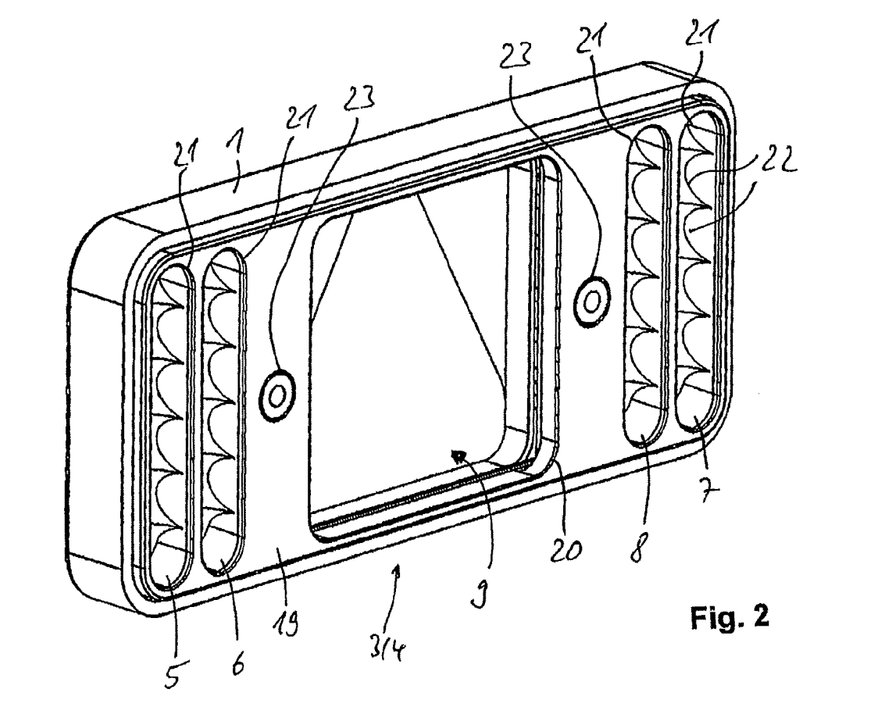
FIG. 2 shows a perspective view of the illumination device without a cover.
Figure 3:
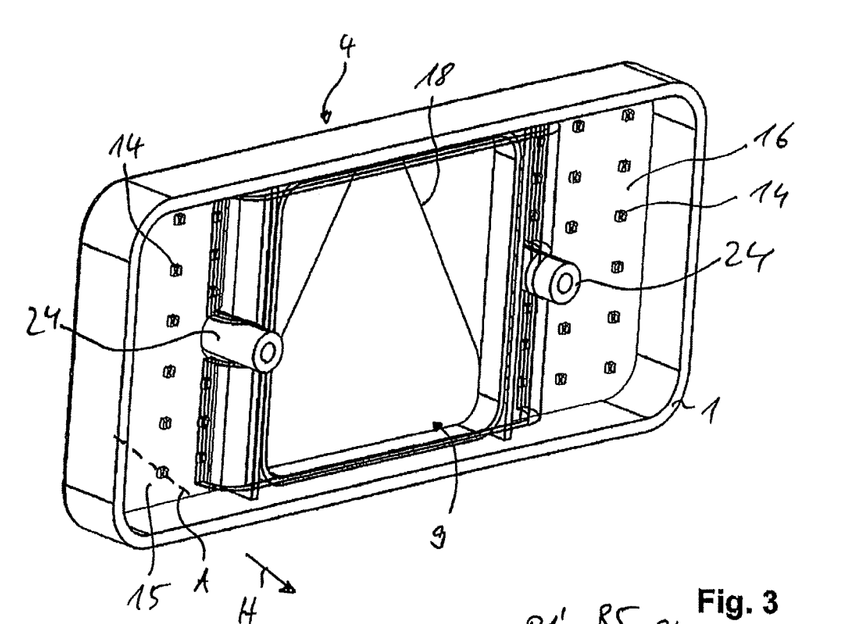
FIG. 3 shows a perspective view of the lighting apparatus with a detached diaphragm.
Figure 4:
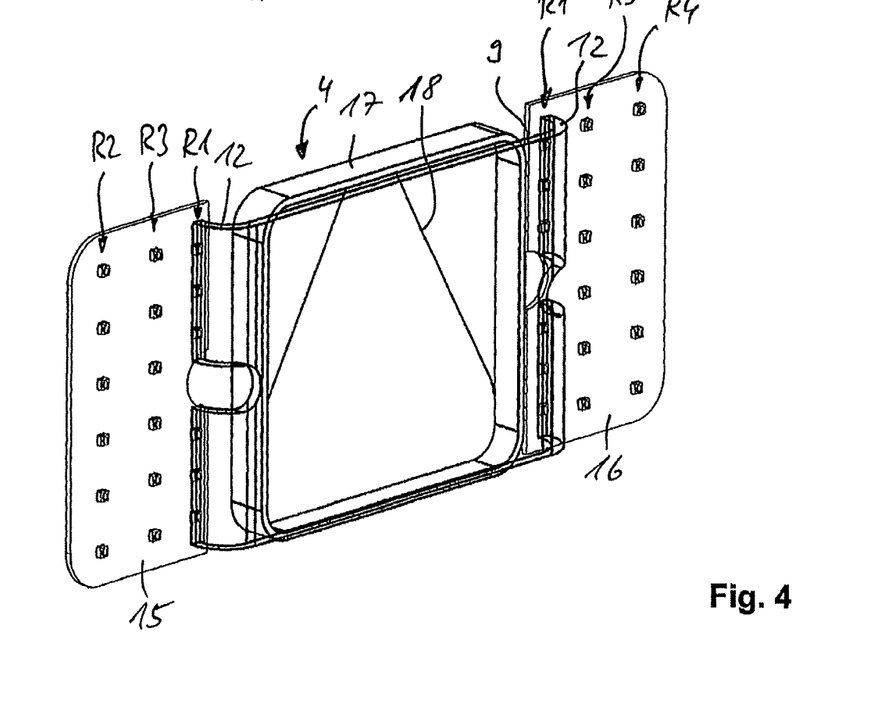
FIG. 4 shows a perspective view of a low-profile light guide, a retroreflective unit arranged behind it, and lateral circuit boards which are equipped with LED light sources, without the housing.
Figure 5:
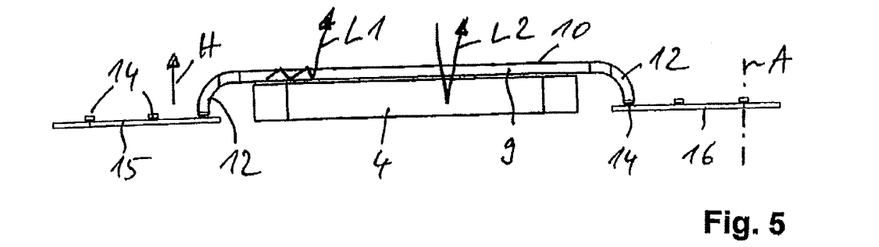
FIG. 5 shows a plan view of the low-profile light guide reflector structure according to FIG. 4.
Figure 6:
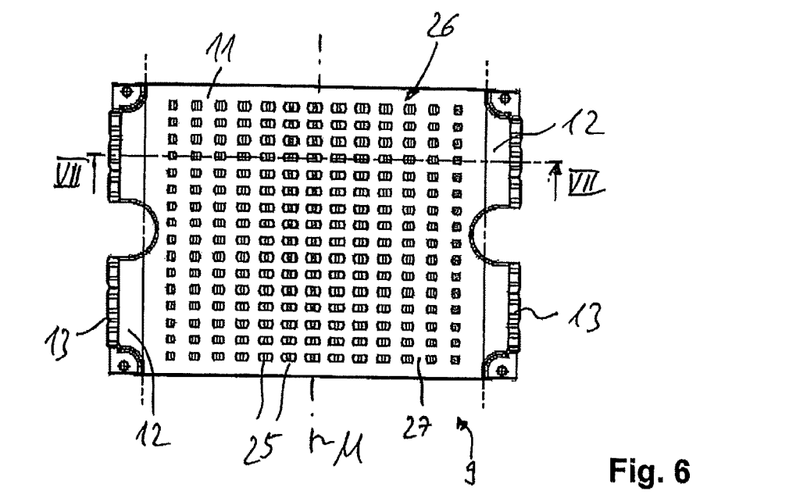
FIG. 6 shows a rear view of the low-profile light guide.
Figure 7:
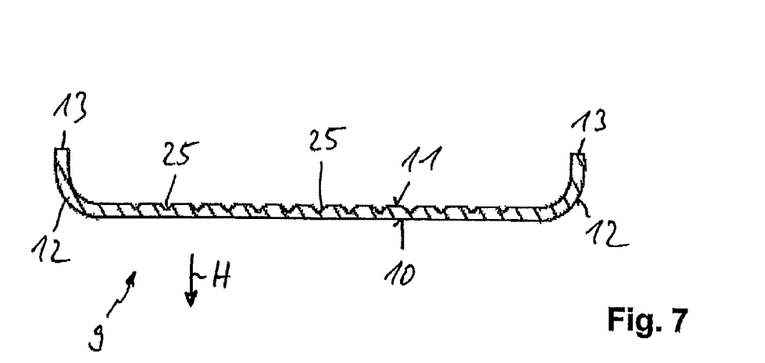
FIG. 7 shows a section through the low-profile light guide along the section line VII-VII in FIG. 6.
Figure 9:
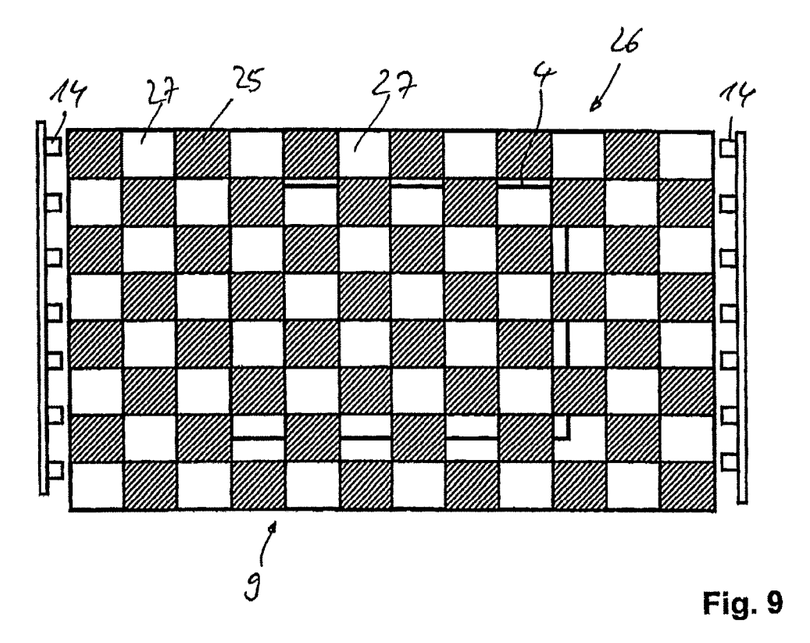
FIG. 9 shows a schematic front view of the illumination device with a light guide surface having a chessboard-like light scattering optics structure.

As becomes clear in particular from FIGS. 6 and 7, the rear flat side 11 of the low-profile light guide 9 comprises a number of dispersive optical elements 25 as means for deflecting the light L injected via the light input section 12 so that upon incidence of the light conducted within the low-profile light guide 9 after total reflection on the front flat side 10 and the rear flat side 11, the light L1 is deflected toward the front flat side 10 and then is coupled out through the front flat side 10 in the main radiation direction H for producing the rear light function. The dispersive optical elements 25 are arranged in a chessboard pattern 26—as schematically illustrated in FIG. 9. The dispersive optical elements 25 are formed as prismatic cuts whose dimension increases with the distance to the light input section 12 up to a median plane M of the low-profile light guide 9. In this way, a light radiation L1 that is uniform over the surface is made possible.

Since the dispersive optical elements 25 are arranged spaced from one another, a dispersive optics-free surface 27 is formed on the rear flat side 11, which—like the completely dispersive optics-free front flat side 10—allows the passage of a second light beam L2. The second light beam L2 enters from the outside through the front flat side 10 and the dispersive optics-free surfaces 27 of the rear flat side 11 of the low-profile light guide 9, strikes the reflecting surface 18 of the retroreflective unit 4, from which it is reflected toward the low-profile light guide 9 so that the second light beam L2 exits through the dispersive optics-free surface 27 of the rear flat side 11 and the front flat side 10 outwards to produce the retroreflective function.

The dispersive optics-free surface 27 of the rear flat side 11 is selected so large that it is equal to or greater than a minimum reflector area. Furthermore, the reflector area 18 of the reflector unit 4 has such a size that it corresponds to the minimum retroreflective area or is greater than it. In this way it is ensured that the legally prescribed minimum reflector area is ensured for the retroreflective function. It is understood that preferably the dimension of the low-profile light guide 9 is greater than the dimension of the retro-reflecting surface 18.

The low-profile light guide 9 is preferably designed as an injection-molded component, wherein the dispersive optical elements 25 are manufactured in one step with the low-profile light guide 9. Preferably, the low-profile light guide 9 and the retro-reflecting surface 18 are colored red.

According to a not shown alternative embodiment of the invention, the dispersive optical elements 25 can also be formed of the same size, wherein the distribution density thereof becomes larger from the light input section 12 toward the median plane M.

According to an alternative embodiment of the invention, the dispersive optical elements 25 can also be applied to the rear flat side 11 of the low-profile light guide 9 by erosion or by etching or by laser.

According to a not shown alternative embodiment of the invention, the dispersive optics element 25 can be applied to the rear flat side 11 of the low-profile light guide 9.

According to a further not shown alternative embodiment of the invention, the means for deflecting the light L1 can be formed by dispersive optical particles, which are arranged within the low-profile light guide 9, i.e., between the front flat side 10 and the rear flat side 11. The distribution of the dispersive optical elements is—not as in the previous embodiments—not limited to the back flat side 11 of the low-profile light guide 9.

Preferably, the dispersive optical particles are formed as nanoparticles whose dimensions are in the nanometer range. These nanoparticles are preferably uniformly distributed within the low-profile light guide 9. The nanoparticles are arranged within the low-profile light guide 9 in such a concentration that with the reflection of the second light beam L2 by the light guide surface 9 it is reduced not more than by 30%. In this way, the retroreflective function is secured.

It is always assumed that the second light beam L2 passes the light beam L2 transversely to the low-profile light guide 9, wherein it is refracted at the front flat side 10 or the rear flat side 11.

According to a further alternative embodiment of the invention, the light guide may also consist of a first material containing the nanoparticles and a second material that is formed nanoparticle-free. In this way, dispersive optics-free and dispersive optics containing areas of the low-profile light guide can be formed so that, for example, in a longitudinal section of the low-profile light guide there arises a chessboard pattern of the first and second materials. This low-profile light guide can preferably be manufactured by a 2-component injection molding process.

It is understood that the light sources 14 are configured as LED light sources. Alternatively, other semiconductor light sources can be used.

The printed circuit boards 15, 16 are preferably formed as rigid circuit boards.

In FIG. 9 is schematically shown the chessboard pattern 26 of the rear flat side 11 consisting of dispersive optical elements 25 and dispersive optics-free areas 27. In this embodiment, the low-profile light guide 9 can be formed as a plate, wherein the front flat side and the rear flat side are connected together by narrow sides. The light L1 is launched not in the main radiation direction H—as is the case in the preceding embodiments—but rather transverse to the main radiation direction H in the longitudinal direction of the low-profile light guide 9. In FIG. 9, the contour of the reflector unit 4 is sketched in, which is smaller than the low-profile light guide 9. However, the sections of the dispersive optics-free areas 27 overlapping the retroreflector surface 18 are so large that a retroreflective function is ensured.

The same components or component functions of the embodiments are provided with the same reference numerals.

Figure 8:
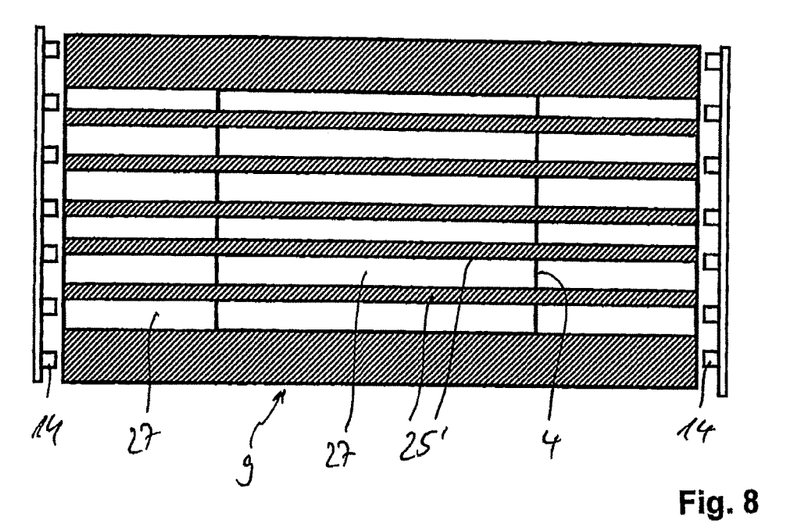
FIG. 8 shows a schematic front view of the illumination device with a low-profile light guide, having a linear light scattering optics structure.

According to an alternative embodiment of the invention according to FIG. 8, the dispersive optics elements 25' are arranged in strips on the rear flat side 11 of the low-profile light guide 9.

If necessary, the dispersive optical elements 25, 25' can be also arranged in a different pattern, for example a checker pattern. The dispersive optical elements themselves can be designed as circular areas, triangular or polygon areas or in another form.

The low-profile light guide interspersed with the nanoparticles appears in optical examination crystal clear or as a slightly diffuse disc with no apparent structure. Upon illumination of the low-profile light guide from the narrow side, the light propagates in the area under total reflection at the front and rear flat sides and is scattered at the nanoparticles so that the entire low-profile light guide is uniformly illuminated. The nanoparticles cause only a very small scattering of the light L2 transmitted transversely to the low-profile light guide so that the retroreflective function is ensured.

The invention enables the space-saving combination of a passive reflecting function with an active light-emitting function. The active light-emitting function can also be used to produce a different light function.

| List of reference numerals | | | |
|---|---|---|---|
| 1 | Housing | | |
| 2 | Central region | | |
| 3 | Light emitting unit | | |
| 4 | Retroreflective unit | | |
| 5 | Brake light unit | | |
| 6 | Flashing light unit | | |
| 7 | Rear fog light unit | | |
| 8 | Reversing light unit | | |
| 9 | Low-profile light guide | | |
| 10 | Front flat side | L1.L2 | Light beam |
| 12 | Rear flat side | A | Axis |
| 13 | Narrow side | M | Median plane |
| 14 | Light sources | H | Main radiation direction |
| 15 | 1. circuit board | R1, R1' | Row |
| 16 | 2. circuit board | R2, R2' | Row |
| 17 | Housing | R3, R3' | Row |
| 18 | Retroreflective unit | R4, R4' | Row |
| 19 | Covering diaphragm | L | Light |
| 20 | Square opening | | |
| 21 | Line-shaped openings | | |
| 22 | Reflector segments | | |
| 23 | Attaching means | | |
| 24 | Domes | | |
| 25, 25' | Dispersive optical elements | | |
| 26 | Chessboard pattern | | |
| 27 | Dispersive optics-free area | | |

The invention claimed is:

1. An illumination device for vehicles comprising:
a light-emitting unit to generate a predetermined light function, said light-emitting unit comprising:
a plurality of light sources;
an optical unit including a light guide having means for deflecting light launched into the same light from the light source;
a retroreflective unit for producing a retroreflective function;
wherein the light guide is formed as a low-profile light guide which is arranged in the main radiation direction in front of the retroreflective unit, and
wherein the means for deflection of the light are distributed at and/or in the low-profile light guide such that:
a first light beam (L1) emitted by the light source and launched into a narrow side of the low-profile light guide is coupled out at a front flat side of the low-profile light guide to produce the predetermined light function, and
a second light beam (L2) irradiating from the outside passes through the front flat side and a rear flat side of the low-profile light guide impinges on the retroreflective unit and is reflected by the same back through the rear flat side and the front flat side of the low-profile light guide in the main radiation direction for producing the retroreflective function.

2. The illumination device according to claim 1, wherein a number of dispersive optical elements is arranged on the rear flat side of the low-profile light guide as means for deflecting the light (L1) so that the light impinging on the dispersing optical element is reflected toward the front flat side for coupling out on it in the main radiation direction.

3. The illumination device according to claim 2, wherein the dispersive optical element are distributed according to a predetermined pattern over the rear flat side of the low-profile light guide.

4. The illumination device according to claim 2 the dispersive optical elements are distributed over the rear flat side of the low-profile light guide according to a stripe pattern or a chessboard pattern.

5. The illumination device according to claim 2 the dispersive optical elements are applied by erosion or by etching or by laser to the rear flat side of the low-profile light guide.

6. The illumination device according to claim 2 the dispersive optical elements are applied by printing or by painting to the rear flat side of the low-profile light guide.

7. The illumination device according to claim 2 the light sources are arranged on a circuit board, which is equipped with further light sources for producing further light functions.

8. The illumination device according to claim 2 the low-profile light guide is made by injection molding and in that the dispersive optical element with increasing distance to the light input section are arranged in a higher or greater distribution density so that the first light beam (L1) is homogeneously irradiated from the low-profile light guide for producing the light function.

9. The illumination device according to claim 1, wherein dispersing optical particles are distributed in the low-profile light guide as means for deflecting the light (L1).

10. The illumination device according to claim 9, wherein the dispersing optical particles are formed as nanoparticles, which are uniformly distributed in the low-profile light guide.

11. The illumination device according to claim 10, wherein the nanoparticles are arranged in such a concentration in the low-profile light guide that the reflection of the second light beam (L2) through the low-profile light guide is reduced by not more than 30%.

12. The illumination device according to claim 10, wherein the low-profile light guide consists of a first material containing nanoparticles and a nanoparticle-free second material.

13. The illumination device according to claim 12, wherein the low-profile light guide is manufactured by two-component injection molding.

14. The illumination device according to claim 1 the low-profile light guide comprises on the edge side an arcuate light input section having the light input narrow side, and that the narrow side is associated with a plurality of light sources whose optical axes (A) extend in the main radiation direction.

15. The illumination device according to claim 1 the light input section is covered by a diaphragm.

16. The illumination device according to claim 1 wherein the retroreflective unit has a reflecting surface of such a size and in that the low-profile light guide comprises a dispersive optics-free surface of such a size that it corresponds to a minimum reflecting area or that it exceeds the minimum reflecting area.

17. The illumination device according to claim 16 wherein at least one of the low-profile light guide and the reflecting surface are colored red.

18. The illumination device according to claim 16 the flat sides of the low-profile light guide have a greater dimension than the reflecting surface of the retroreflective unit.

\* \* \* \* \*